United States Patent Office 2,826,439
Patented Mar. 11, 1958

2,826,439

ARC BRAZING DEVICE

Roger W. Sholle and Maurice A. Enright, Lorain, Ohio, assignors to Gregory Industries, Inc., Detroit, Mich., a corporation of Michigan Application March 15, 1954, Serial No. 416,343

4 Claims. (Cl. 287—20.2)

This invention relates in general to an arc brazing device for brazing terminals to plates or for brazing a stud to a plate using an arc established between brazing material and the plate.

Various methods and devices have been designed in the past for brazing terminals to plates or work pieces. A major application is the brazing of the terminals on electrical rail bond connections to rails. On one of these devices an arc is drawn between brazing material on the end of a stud and a rail or the work plate. The brazing material was secured to the end of the stud by melting the brazing material on the stud using flux. After the brazing material was applied to the end of the stud using heat, the brazing material was again provided with flux. In this device studs carrying the brazing material were expensive to manufacture since the brazing material was secured to the stud by brazing, wherein heat was used to fuse the brazing material to the stud. This device also did not use the heat resistant housing disclosed in the present application.

One of the objects of the present invention is to provide a brazing device for brazing a terminal to a plate which includes a heat resistant housing and a brazing member having a lower melting temperature than the melting temperature of the plate or terminal, wherein the member contains brazing flux.

Another object of the present invention is to provide a brazing stud for the device which has a member of brazing material and a current conducting supporting body mechanically joined together. Throughout this description and the attached claims the term mechanically or mechanically joined is used to describe methods of securing the brazing material to the body without using heat which will braze the brazing material to the body. The term includes such means as press fits, friction, or other mechanical locking devices such as indentations, overlapping shoulders, etc., which are not illustrated.

A further object of the present invention is to provide a body of current conducting material with a member of brazing material mechanically fixed thereto, wherein the member contains brazing flux with the member and brazing flux having a melting temperature lower than the melting temperature of the body.

A still further object of the present invention is to form a brazing stud wherein a current conducting body and a member of brazing material having a recess containing flux are mechanically joined together with the brazing flux engaging the body.

A still further object of the invention is to provide a brazing device which is easily and economically manufactured with the parts being joined together by mechanical means.

Other objects and a fuller understanding of the invention will become apparent from the description and claims and the drawings in which:

Figure 1:
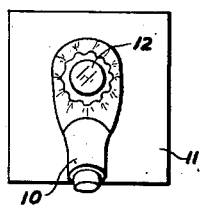
Figure 1 is an elevational view of a terminal brazed to a plate.
Figure 2:
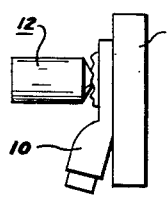
Figure 2 is a side view of a terminal brazed to a plate.
Figure 3:
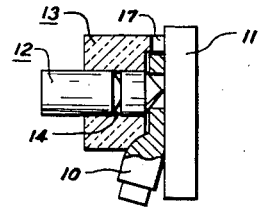
Figure 3 is a side view partly in section illustrating a brazing device in position for brazing the terminal to the plate.

An example of the finished product obtained from using the brazing device for brazing a terminal to a plate is illustrated in Figures 1 and 2. In Figures 1 and 2 reference character 10 represents a terminal which is brazed to a plate 11. In these views the brazing stud has not been broken from the terminal and plate after the brazing was completed. The device for brazing the terminal to the plate comprises brazing stud 12 and a heat resistant housing 13 as illustrated in Figure 3. In using the brazing device the housing 13 substantially encloses the terminal 10 and holds it next to the work 11 such as a rail or plate. The brazing stud 12 is slidable in an opening 14 in the housing and is capable of connection to a source of electrical current. In actual practice electrical connection is made by inserting the brazing stud 12 in a stud welding gun, such as that illustrated in Patent No. 2,413,189, issued to T. Nelson, December 24, 1946. The work or plate 11 may be connected to the ground or the opposite side of the source of welding current by any suitable manner so that an arc may be established either between the brazing stud 12 and the terminal 10 or between the brazing stud 12 and the plate 11. An arc established within the housing 13 and at the end of the brazing stud 12 melts brazing material thereon causing it to braze the terminal 10 to the work or plate 11.

Figure 4:
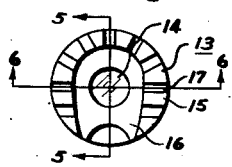
Figure 4 is a plan view of the heat resistant housing used in the device.
Figure 5:
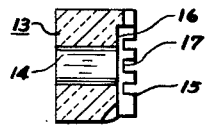
Figure 5 is a sectional view taken along the line 5—5 of Figure 4.
Figure 6:
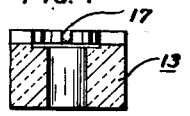
Figure 6 is a sectional view taken along the line 6—6 of Figure 4.

The housing 13 which is used in brazing a terminal to a plate comprises a heat resistant material formed with a recess defined by a wall portion 15 and a bottom surface 16 at one end thereof. As illustrated in Figures 4, 5 and 6, the wall portion and bottom surface are dimensioned so that the recess will receive the terminal which is to be brazed to the plate. The wall portion 15 extends out from the bottom surface 16 a distance at least equal to the thickness of the terminal so that the wall will seat against the plate while the terminal is in the recess, as indicated in Figure 3. If the recess is deeper than the thickness of the terminal, the terminal can be positioned slightly away from the plate during brazing to provide a thicker layer of brazing material between the terminal 10 and the plate 11.

The wall portion 15 is generally provided with vent means such as the serrations 17 which permit venting of gases from the terminal recess during the arc brazing. The hole 14 which slidably receives brazing pin 12 extends transverse to the bottom surface 16 of the recess. The particular terminal illustrated in Figure 3 has an opening or a hole therein positioned in alignment with the housing 13 so that the brazing stud 12 can project into the hole in the terminal. Tests indicate that the best results will be obtained in actual field use of this device when the hole 18 in the terminal is smaller in diameter than the diameter of the brazing stud 12. However, it is understood that good brazed bonds have been obtained between the terminal 10 and the plate 11 when the brazing stud 12 was smaller than the diameter of the hole 18. In each case the stud 12 is slidable in the hole 14 in housing 13. The housings 13 are made from a heat resistant material such as ceramics or clays with a new housing being used for each new brazing stud.

Figure 7:
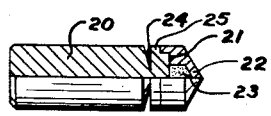
Figure 7 is a view partly in section of a preferred stud used in the brazing device.

A preferred design for a brazing stud to be used as the brazing stud 12 in Figure 3 is illustrated in Figure 7. This brazing stud, Figure 7, comprises a body 20 of current conducting material having an end 21. Mechanically affixed on the end 21 of the body 20 is a hollow member 22 of brazing material. The member 22 of brazing material has a lower melting temperature than the melting temperature of the body and contains flux 23 which engages the end 21 of the body 20. In this preferred design the member 22 has a somewhat conical point with a wall thickness at the point less than the wall thickness at a distance from the point.

The body 20 is usually of ferrous material and is provided with fracture means such as groove 24 for the majority of brazing studs used in brazing terminals 10 to plates 11. In the preferred design the end 21 is also provided with a shoulder 25 against which the circumferential edge of the member 22 seats. In actual assembly the member 22, which is preferably of a silver brazing composition is formed in a hollow shape and the body 20 is formed to shape in separate operations. After both of these parts are formed to shape, a powdered flux is inserted in the recess in the hollow member 22 and the end 21 of the body 20 is inserted in this recess to close the recess and hold the flux therein. This mechanical fixing of the member 22 to the end 21 provides an economical way to manufacture the brazing pins. Since the conical point is thinnest right at the point and the flux engages the end 21 of the body 20, the flux is allowed to clean both the surface of the end 21, the terminal 10 and the plate 11 when an arc is drawn between the member 22 and the plate or terminal.

The conical point on member 22 also centers the stud in the hole in the terminal thereby ensuring movement of end 21 into the hole after the arc has melted member 22. After the arc has melted the brazing material, the brazing stud is pushed into the terminal until the end 21 is next to the rail or plate 11. The molten brazing material flows between the terminal 10 and plate 11 and around the end of the body to braze the parts together. Since the fracturable means or groove 24 is positioned from the end surface 21 a distance substantially equal to the thickness of the terminal, the groove is nearly flush with the top side of the terminal after brazing. Actually the flange or shoulder 25 often seats tight against the top side of the terminal when the braze is completed. The major portion of the body of the brazing stud may be removed by breaking the body at this groove, thereby leaving the end of the body in the brazed joint.

Figure 8:

The brazing stud illustrated in Figure 8 is similar to that of Figure 7 with the exception that in Figure 8 the shoulder has been omitted and the member of brazing material extends clear to the groove or fracturable means. The stud is used in the same manner as that of Figure 7 and produces the same type of brazed joint except there is no shoulder on the stud body to seat against the top side of the terminal.

Figure 9:
Figure 10:

The variations of a brazing stud illustrated in Figures 9 and 10 are similar to those of Figures 7 and 8 with the exception that a thinner wall is used in the brazing member to allow larger cavity space for flux material. As in Figures 7 and 8, the members of brazing material are mechanically fixed to the ends of the bodies of current conducting material and the flux contained therein engages the end of the body.

Figure 11:
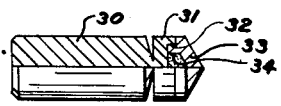

In Figure 11 a brazing stud is constructed from a body 30 having an end 31 provided with a socket 32. A member of brazing material 33 having a recess 34 is mechanically fixed in the socket 32 with the end 31 of the body 30 closing the recess 34. Brazing flux contained in the recess 34 engages end 31. As in the other designs of the brazing stud, the member of brazing material may be constructed with a somewhat conical point with the wall thickness less at the point than at the remaining part of the member. Also the body of the stud may be provided with fracture means such as the groove.

Figure 12:
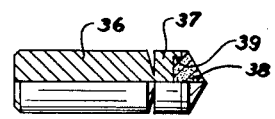
Figures 8, 9, 10, 11, 12, 13 and 14 are views partly in section of various types of studs which can be used in the device.

Another type of brazing stud is illustrated in Figure 12. This stud is similar to those of Figures 7, 8, 9, 10, 11 in that it has a body 36 of current conducting material having an end 37 and a member 38 of brazing material mechanically fixed to this end. The member 38 of brazing material which is mechanically fixed to the end 37 of the body 36, contains brazing flux and has a melting temperature lower than the melting temperature of the body. In this design the member 38 of brazing material consists of brazing material and brazing flux intermixed. The end 37 of the body 36 is provided with a socket 39 and some of the mixture of flux and brazing material forming the member 38 is pressed into the socket 39.

In manufacturing the stud illustrated in Figure 12 powdered brazing material and powdered flux are first mixed together. A quantity of this mixture is then placed in a press and pressed into a somewhat solid mass on the end 37 of the body 36. In this mixture the brazing flux is interspersed throughout the brazing material. Some of the brazing flux contained in the member of brazing material engages the end of the stud body. As the brazing material is melted by an arc during the brazing of a terminal to a plate as illustrated in Figure 3, the flux is activated to clean both the end of the body and the plate to which the end of the body is to be brazed as well as the surrounding surfaces of the terminal.

Figure 13:
Figure 14:

The studs illustrated in Figures 13 and 14 are similar to the stud illustrated in Figure 12. However, in Figure 13 the end of the body is provided with a small projection 40 over which some of the brazing material forming the member is pressed to form the mechanical fixing of the member of brazing material on the end of the body. In Figure 14 the end of the body is provided with a small hole 41 into which some of the brazing material forming the member is pressed. The body portion of the stud is also of smaller diameter than the end which mechanically holds the brazing material. This permits manufacture of the body portion from smaller diameter rod by using cold heading machinery.

Any one of the brazing studs of Figures 7 through 14 inclusive may be used for the brazing stud 12 in Figures 2 and 3. It is also understood that any of the studs of Figures 7 through 14 inclusive may be made with the body portion smaller than the end portion. Although cylindrical studs have been illustrated, since they are the most practical to manufacture, other cross section designs such as square, rectangular, octangular, etc., may be used. In each case the hole in the housing would be generally symmetrical with the stud.

Figure 15:
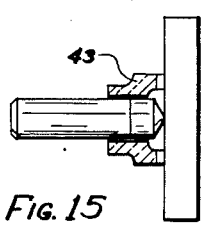
Figure 15 is a side view partly in section of a stud positioned to be brazed directly to a work plate.

Although these brazing studs illustrated in Figures 7 through 14 inclusive have been designed for securing terminals to plates or work as illustrated in Figures 1, 2 and 3, it is understood that the brazing studs may be brazed directly to a plate as indicated in Figure 15. In Figure 15 the stud is positioned with the point touching the plate just prior to establishing an arc between the brazing material on the end of the stud and the plate. An arc established between the brazing material and the plate melts the brazing material and activates the flux to clean the opposing surfaces of the end of the body of the stud and the plate. After the flux has been activated and the brazing material is completely melted, the body of the brazing stud is moved to the plate and the brazing material is allowed to solidify between the end of the stud and the plate. A heat resisting housing is also used in this application such as a housing indicated by reference character 43. Brazing studs for this application may be constructed either with or without the fracturable means or groove. The housing illustrated in Figure 15 has been used in place of the housing illustrated in Figures 3 through 6 inclusive for brazing terminals to plates. The braze obtained is satisfactory for many applications.

Although this invention has been described in its preferred form with a certain degree of particularity enabling others to reproduce the invention, it is understood that the present disclosure has been made by way of example and that numerous modifications and changes in the details may be resorted to without departing from the spirit and scope of the invention as defined in the claims which are made a part hereof.

The embodiments of the invention in which an exclusive property or privilege is claimed are defined as follows:

1. A brazing stud comprising a member of brazing material having a peripheral wall defining a cavity, brazing flux in said cavity, and a current conducting supporting body fitted in and closing said cavity, said member having a lower melting temperature than said body, said peripheral wall having a cylindrical portion and a conical portion terminating in a point with the wall thickness at the point being less than the wall thickness at a distance from the point, whereby an arc readily burns through the point to melt the flux before the peripheral wall melts, said member having a melting temperature higher than the activating temperature of said flux.

2. The structure of claim 1 wherein said body is provided with a flange and said member abuts against said flange, said flange having an outside diameter approximately equal to the outside diameter of said member.

3. Brazing stud comprising a body of current conducting material having an end, a hollow member of brazing material affixed on said end of said body, and brazing flux within said hollow member and engaging said end, said member having a lower melting temperature than said body and having a somewhat conical point of less wall thickness than the wall thickness of the remaining portion of the member.

4. The structure of claim 3 wherein said end of said body is provided with a flange and said member abuts against said flange, said flange having an outside diameter approximately equal to the outside diameter of said member.

References Cited in the file of this patent
UNITED STATES PATENTS

| | | |
|---|---|---|
| Re. 22,411 | Nelson | Dec. 21, 1943 |
| 2,315,502 | Grecca et al. | Apr. 6, 1943 |
| 2,384,403 | Somers | Sept. 4, 1945 |
| 2,402,659 | Nelson | June 25, 1946 |
| 2,416,204 | Nelson | Feb. 18, 1947 |
| 2,477,765 | Nelson | Aug. 2, 1949 |
| 2,493,283 | Evans | Jan. 3, 1950 |
| 2,506,747 | Smith | May 9, 1950 |
| 2,584,491 | Nelson | Feb. 5, 1952 |
| 2,638,525 | Candy | May 12, 1953 |
| 2,643,319 | Willigen | June 23, 1953 |
| 2,711,798 | Aversten | June 28, 1955 |